United States Patent Office 2,759,867
Patented Aug. 21, 1956

2,759,867

CYCLOHEXYL-PHENOL-ALKYLENE-OXIDE REPELLENT AND METHOD

Vivian H. Melass, Lake Jackson, Tex., assignor to The Dow Chemical Company, Midland, Mich., a corporation of Delaware No Drawing. Application November 27, 1953, Serial No. 394,874

4 Claims. (Cl. 167—30)

This invention is concerned with insect repellents and is particularly directed to a method of repelling noxious insects and a repellent composition employing certain complex organic compounds resulting from the condensation of ortho-cyclohexylphenol and alkylene oxides.

In recent years the development of potent synthetic organic toxicants has served to alleviate in many instances the problems of man and his domestic animals with respect to insects. However, many situations still exist in which it has not been found possible to control insect infestation and attack, and where effective insect repellents are desirable to promote the comfort and health of both man and animals.

It is an object of the present invention to provide a novel method and composition for the repelling of insects. It is a further object to provide such method and composition characterized by ease of application and long-lasting beneficial results. An additional object is to provide a method and composition specifically for the repelling of flies on animals. Other objects will become apparent from the following specification and claims.

According to the present invention, it has been discovered that certain ortho-cyclohexylphenol-alkylene oxide condensation products are highly effective in repelling insects. The condensation products employed in the invention are characterized by containing both propylene oxide and ethylene oxide residues in the polyoxyalkylene side chain and may be represented by the following formula

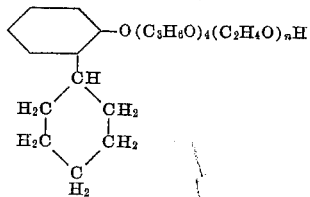

wherein $n$ is an integer from 7 to 9, inclusive. It should be understood in the above representation that the chain composed of the four propylene oxide residues is directly connected to the benzene ring through the phenolic ether bond and that the chain then continues more remotely from the ring through the ethylene oxide addition. The repellent condensation products are oily liquids of low volatility, somewhat soluble in many organic solvents and in water. It is among the advantages of the invention that the condensation products employed are characterized by marked persistency of insect repellent activity and by ease of application to the sites to be protected. In the latter connection the condensation products appear to exhibit a considerable degree of activity as surface-active agents and are adapted to produce aqueous compositions having desirable wetting and spreading properties.

The condensation products employed in the invention are prepared by reacting one molecular proportion of ortho-cyclohexylphenol with four molecular proportions of propylene oxide at a temperature of 100°–150° C. under autogenous pressure and in the presence of an alkaline catalyst. The resulting tetrapropylene glycol ortho-cyclohexylphenyl ether with the catalyst still present is then reacted in a similar fashion with 7 to 9 molecular proportions of ethylene oxide to produce the desired condensation product. If desired, the catalyst may thereafter be removed from the product in the form of sodium carbonate or bicarbonate by adding to the product a small proportion of water and carbon dioxide followed by removal of the water and filtration of the product.

In carrying out the invention, the active condensation product may be applied in any suitable fashion. For example, the condensation product may be applied directly in undiluted form. Alternatively, the condensation product may be dissolved in a suitable solvent such as a lower aliphatic alcohol to prepare lotions or be incorporated into unguents or creams adapted to be rubbed on the skin. Further, the active repellent agent may be dispersed in water to prepare aqueous spray dispersions, suitable, for example, for application to cattle. Similarly, the repellent may be combined with other conventional spray materials such as insecticidal emulsions or dispersions.

In practice, the active condensation product or a composition containing the same is applied so as to cover the area to be protected against insect attack. For example, the undiluted condensation product or a lotion or cream composition thereof may be applied by rubbing or brushing the active material onto the surface to be protected. Similarly aqueous solutions or dispersions may be applied as a brushing composition or dip or by spraying with conventional equipment.

Any suitable proportion of the active condensation product may be employed in the compositions of the invention, provided that the composition is adapted to supply a repellent amount of the active compound when applied to the surface to be protected. In lotions, creams and the like, from 5 to 50 percent or more by weight of the condensation product is employed. In the application of the active repellent compound in an aqueous spray, good results have been obtained when employing one percent or more by volume of the condensation product based on the total volume of such aqueous composition.

In a representative operation, 882 grams (5 moles) of ortho-cyclohexylphenol was reacted with 12 grams of metallic sodium in a pressure kettle which had been purged with nitrogen before introducing the reactants. The resultant mixture was heated to 100° C. and 1160 grams (20 moles) of propylene oxide added thereto with stirring and under sufficient pressure to maintain the propylene oxide predominantly in liquid form. The reaction mixture was then maintained at a temperature of 100° to 150° C. and under autogenous pressure for a period of time until the pressure dropped to essentially atmospheric, indicating completion of the reaction. 1760 grams (40 moles) of ethylene oxide was then added to the above and the reaction carried out as with the propylene oxide. The resulting condensation product was a viscous liquid, soluble in benzene and ethanol, having a specific gravity of 1.071 at 25° C., and a refractive index ($n/D$) of 1.4867 at 25° C., and characterized by a cloud point of 41°–42° C. for an aqueous 10 percent solution thereof.

The condensation product prepared as set forth above, was dissolved in water to prepare an aqueous spray composition containing 3 percent by volume of the active repellent compound. This composition was sprayed with a knapsack sprayer operated at 30 to 40 pounds per square inch pressure to obtain even coverage of cattle pastured in an area heavily infested with horn-flies. Other cattle were left unsprayed to serve as checks. Counts of horn-flies feeding on sprayed and unsprayed cattle were taken 3 times daily. Preliminary counts made for three days before the spraying operation had established an average infestation of 35 horn-flies per untreated animal per counting period. On the first and second day after spraying, the counts on the sprayed cattle were reduced 92 and 87 percent, respectively, from the expected counts based on counts for the unsprayed cattle. Over a period of 21 days the sprayed cattle showed a 63 percent average reduction of horn-fly infestation as compared to the unsprayed check animals.

I claim:

1. A method for repelling horn-flies which comprises applying to the surface to be protected an ortho-cyclohexylphenol-alkylene oxide condensation product of the formula

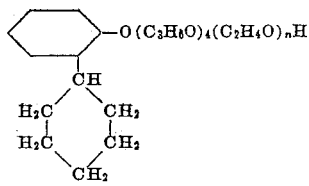

wherein $n$ is an integer from 7 to 9, inclusive.

2. A method for repelling horn-flies from cattle which comprises applying to the cattle an ortho-cyclohexylphenol-alkylene oxide condensation product of the formula

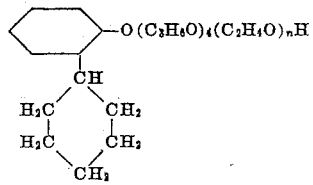

wherein $n$ is an integer from 7 to 9, inclusive.

3. A composition for repelling horn-flies from cattle which comprises as an essential repellent ingredient an ortho-cyclohexylphenol-alkylene oxide condensation product, having the formula

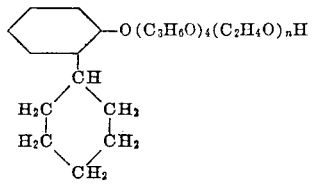

where $n$ is an integer from 7 to 9, inclusive.

4. A composition for repelling horn-flies from cattle which comprises an aqueous dispersion of an ortho-cyclohexylphenol-alkylene oxide condensation product of the formula

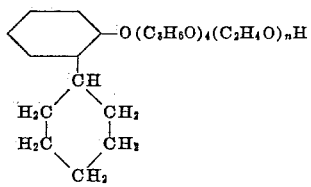

wherein $n$ is an integer from 7 to 9, inclusive.

References Cited in the file of this patent

UNITED STATES PATENTS

| | | |
|---|---|---|
| 2,442,760 | Dieter et al. | June 8, 1948 |
| 2,624,706 | Maxcy | Jan. 6, 1953 |
| 2,674,619 | Lundsted | Oct. 19, 1953 |
| 2,677,700 | Jackson | May 4, 1954 |